(12) United States Patent
Fujita et al.

(10) Patent No.: US 7,281,766 B2
(45) Date of Patent: Oct. 16, 2007

(54) SEAT STRUCTURE

(75) Inventors: Etsunori Fujita, Hiroshima (JP); Yasuhide Takata, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 162 days.

(21) Appl. No.: 11/172,963

(22) Filed: Jul. 5, 2005

(65) Prior Publication Data

US 2006/0076816 A1    Apr. 13, 2006

(30) Foreign Application Priority Data

Jul. 5, 2004    (JP)    .............................. 2004-198542

(51) Int. Cl.
*B60N 2/20* (2006.01)
(52) U.S. Cl. .............................. 297/378.12; 297/354.1; 297/354.12; 297/361.1; 297/362.12; 297/367; 297/378.1
(58) Field of Classification Search ............. 297/354.1, 297/354.12, 361.1, 367, 378.1, 378.12, 378.14, 297/362.12
See application file for complete search history.

(56) References Cited

U.S. PATENT DOCUMENTS

| | | | | |
|---|---|---|---|---|
| 3,774,964 A | * | 11/1973 | Turner .................. | 297/361.1 X |
| 3,840,268 A | * | 10/1974 | Johndrow et al. .......... | 297/366 |
| 3,926,474 A | * | 12/1975 | Johndrow et al. ...... | 297/354.12 |
| 4,178,037 A | * | 12/1979 | Pickles ............... | 297/378.12 X |
| 4,218,092 A | * | 8/1980 | Schach et al. .............. | 297/367 |
| 4,294,488 A | * | 10/1981 | Pickles ........................ | 297/367 |
| 4,836,607 A | * | 6/1989 | Kluting .................. | 297/354.12 |
| 5,156,439 A | * | 10/1992 | Idlani et al. ................. | 297/367 |
| 5,466,048 A | * | 11/1995 | Fowler et al. ......... | 297/378.12 |
| 5,547,254 A | * | 8/1996 | Hoshihara .................... | 297/367 |
| 6,142,552 A | * | 11/2000 | Husted et al. ...... | 297/378.12 X |
| 6,505,889 B2 | * | 1/2003 | Frolo et al. ............ | 297/354.12 |
| 6,619,744 B2 | * | 9/2003 | Reubeuze .............. | 297/378.12 |
| 6,631,954 B2 | * | 10/2003 | Amorin et al. .......... | 297/378.1 |
| 6,663,180 B2 | * | 12/2003 | LeTournoux ........... | 297/378.12 |
| 6,736,460 B2 | * | 5/2004 | Becker et al. ......... | 297/378.12 |
| 6,789,849 B2 | * | 9/2004 | Gray ..................... | 297/378.12 |
| 7,104,607 B2 | * | 9/2006 | Yasuda et al. ........... | 297/354.1 |
| 7,137,664 B2 | * | 11/2006 | McMillen et al. ....... | 297/284.4 |

FOREIGN PATENT DOCUMENTS

JP    A-06-001174    1/1994

* cited by examiner

*Primary Examiner*—Rodney B. White
(74) *Attorney, Agent, or Firm*—Oliff & Berridge, PLC (57) ABSTRACT

A vehicle seat is provided with a pair of left and right seatback side frames comprising a seatback frame. The seatback frame is connected to the rear end of a seat portion frame via a reclining mechanism. The vehicle seat is further provided with a torsion bar that is an elastic body between the reclining mechanism and the seatback frame. When the seatback frame displaces and falls forward relative to the seat portion frame, the torsion bar deforms and resists the displacement of the seatback frame. The torsion bar is arranged at the upper region of the seat occupant's pelvis.

11 Claims, 8 Drawing Sheets

SEAT STRUCTURE

CROSS-REFERENCE TO RELATED APPLICATION

This application claims priority under 35 USC 119 from Japanese Patent Application No. 2004-198542, the disclosure of which is incorporated by reference herein.

BACKGROUND OF THE INVENTION

1. Field of the Invention

The present invention relates to a seat, particularly a vehicle seat mounted in a vehicle such as an automobile.

2. Description of the Related Art

Vehicle seats are configured so that, for example, a back portion (i.e., seatback) is connected to a rear end portion of the seat portion (i.e., seat cushion) so that the tilting positions are adjustable through a reclining mechanism.

A configuration provided with a thick-type back portion frame for ensuring the rigidity of the back portion is known. Since the rigidity of the back portion frame is high with this type of vehicle seat, shock absorption by frame deformation during collision is not achieved and the force of the shock (i.e., acceleration) is conveyed to the person seated in the chair as is with no reduction, and there are concerns that it might impart damage to the seat occupant. Further, since the rigidity of the back portion frame is high with this type of vehicle seat, vibration absorption depends on the cushion material provided at the back portion frame and forming the backrest, so it has been difficult to obtain favorable vibration absorption qualities.

On the other hand, a vehicle seat provided with a thin highly elastic back portion frame has also been developed. With this type of vehicle seat, sufficient rigidity of the back portion is ensured during normal driving. Nevertheless, with this type of vehicle seat, when large impact force acts upon it directly, as, for example, is the case when the front portion of the vehicle collides into something (front collision) and cargo or freight loaded in the luggage compartment or the rear seat collides into the back portion, the rigidity is insufficient. When plastic deformation of the back portion frame occurs, it is thought possible that it will tilt forward greatly relative to the seat portion. When plastic deformation of the back portion frame occurs, the survival space of the seat occupant reduces while the shock that accompanies rocking return towards the back of the person cannot be absorbed (i.e., the shock-absorbing stroke is insufficient). Further, with this kind of vehicle seat, there is insufficient rigidity relative to shock so, for example, at the time of rear collision, there are cases where movement towards the rear relative to the seat of the seat occupant (especially in the pelvis region) cannot be effectively deterred.

Furthermore, vehicle seats are known that are provided, at the base end side of the back portion frame, with a reinforcing component that follows along the widthwise direction of the vehicle (see, for example, the Official Gazette of Japanese Patent Application Laid-Open (JP-A) No. 6-1174). With this vehicle seat, the survival space of the seated person in the widthwise direction of the vehicle is ensured at the time of side collision due to the reinforcing component. Nonetheless, with this vehicle seat, the reinforcing component simply made highly rigid and being free at both ends cannot itself absorb impact so this is only absorbed by the relative movement of the entire seat to the vehicle and the like conveying of shock to the floor of the vehicle and the like. Further, for this reason the arrangement of the reinforcing component is also limited to the lower part of the back portion, so safety against collision from, as described above, freight and the like during a frontal collision cannot be achieved.

SUMMARY OF THE INVENTION

In light of the above circumstances, the present invention provides a seat with improved safety where, even if the seatback frame is made to be thin, rigidity is ensured.

The seat of the first embodiment of the present invention comprises a seatback frame where a pair of left and right side frames are respectively connected to the rear end side of a seat portion; and an elastic component that is provided between the seatback frame and the seat portion and which resists displacement of the seatback frame relative to the seat portion.

With the seat of the first embodiment of the present invention, when a force such as a force of impact acts upon it to make the seatback frame displace relative to the seat portion (i.e., a force that deforms the seatback frame or breaks the portion connecting the seatback frame and the seat portion), an elastic component provided between this seatback frame and the seat portion (i.e., side component) deforms and produces recovery energy that resists this force (displacement). Due to this, the seatback frame achieves improved rigidity with a lighter and thinner structure than when compared to a configuration where the seatback frame is simply connected to the rear edge side of the seat portion.

Further, the elastic component regulates the displacement of the seatback frame relative to the seat portion while absorbing (a part of) the force of impact so that the load of impact imparted to an occupant of the present seat is alleviated while survival space is ensured, thereby improving safety. This seatback frame does not possess high overall rigidity, especially when the seatback frame is made to be thin, so when compared to a thick seatback frame, its vibration absorption (interception) qualities and impact absorption qualities are good.

In this manner, with the seat of the first embodiment of the present invention, good rigidity can be ensured even if the seatback frame is made thin and safety is improved.

The seat of the first embodiment of the present invention can be configured so that the elastic component is a torsion bar whose one end is fixed to one of the pair of side frames while the other end is fixed to the rear edge side of the seat portion at the other side of the pair of side frames.

The seat with the above-described configuration is provided with a torsion bar along the widthwise direction of the seat (i.e., in the left and right directions), and when the seatback frame displaces in a direction so as to fall towards the seat portion, the torsion bar twists and resists the displacement of the seatback frame. Due to this, at the time of a frontal collision, even if, for example, cargo and the like or a passenger in the back seat collides into the back portion from the rear portion, plastic deformation of the seatback frame and destruction of the portion connecting the frame to the seat portion and the like are suppressed while impact is absorbed due to the deformation of the torsion bar.

Further, the torsion bar crosses between side frames positioned at end portions that differ from each other in the widthwise direction of the seat and the seat portion (the side components), so the rigidity of the present seat in the left and right directions is improved. For this reason, a survival space is ensured in the widthwise direction of the seat even if, for example, a side collision occurs, and safety against such collisions improves.

Further, the torsion bar can be arranged at positions in the up and down directions corresponding to the upper portion of the pelvis of the seat occupant.

With a seat configured in this manner, the torsion bar crosses between the left and right side frames, whereby the rigidity at the seatback of the portion lower than the upper portion of the pelvis of the seat occupant (i.e., at the lower portion of the seatback frame or at the rear portion of the seat portion frame) is, as described above, strong. For this reason, if, for example, a vehicle equipped with this seat is involved in a rear collision or the like, the pelvis (hip) region of the seat occupant is maintained with the cushioning of the seatback and the seat cushion while movement of the pelvis is suppressed. At this time, the seatback adheres closely to the upper back of the seat occupant so this protects the occupant.

It should be noted that the adhesion between the seatback and the upper body of the seat occupant is improved, so it is preferable that the backrest of the seatback be configured to be provided with a tension structure body at the seatback frame.

The seat of the first embodiment of the present invention can be further provided with a turning component arranged so that one end is turnably supported at the rear edge side of the seat portion and so as to engage the seatback frame that displaces in a front tilting direction relative to the seat portion, and the elastic component can be provided between the turning component and the seat portion.

The seat having this configuration has a turning component turnably supported at the rear edge side of the seat portion and an elastic component provided between this turning component and the seat portion. Accordingly, when the turning component turns, the elastic component deforms and recovery energy is generated. Next, the seatback frame displaces (i.e., deforms or exhibits relative movement) in a forward tilting direction relative to the seat portion, thereby engaging the turning component and receiving the recovery force that resists the displacement. Due to this, even if, for example, a force of impact acts upon the back portion, plastic deformation of the seatback frame is suppressed while the impact is absorbed, and this is due to the deformation of the elastic component.

By also providing the elastic component between the turning component and the seat portion set between the seatback frame and the seat portion in this manner, the rigidity of the seatback frame can be ensured even if it is made thin, and safety is improved. Further, this can be configured so that play is set between the seatback frame and the turning component so that the seatback frame does not receive the recovery force of the elastic component until the turning component engages, such that this play (i.e., stroke and time) makes it possible to easily set the nature of the impact absorption.

The turning component can be made to have a pair of arms that are respectively arranged so as to be able to engage each of the side frames that displace in a front tilting direction relative to the seat portion while being connected to each other via a coupling component; and the elastic component can be a torsion bar that is provided at a turning center relative to the seat portion of the arms, and one end of the torsion bar is fixed to one of the pair of arms while the other end is fixed to the rear end side of the seat portion at the other one of the pair of arms.

The seat with the above-described configuration is provided with a torsion bar along the widthwise direction of the seat (i.e., in the left and right directions), and when the seatback frame displaces in a direction so as to fall towards the seat portion (i.e., deforms in a falling direction), each side frame respectively engages the turning component and the torsion bar twists. The recovery force of this torsion bar resists the deformation of the seatback frame. Due to this, at the time of a frontal collision, even if, for example, cargo or a passenger in the back seat collides into the back portion from the rear portion, plastic deformation of the seatback frame is suppressed while impact is absorbed due to the deformation of the torsion bar.

Furthermore, the pair of arm components are connected to each other with a coupling component, so even if impact force is inputted to either the left or right side frames to one side, the torsion bar remains stable and twists so improvement of rigidity can be contributed to with certainty. Furthermore, the torsion bar crosses between side frames positioned from different sides in the widthwise direction of the seat and the seat portion (i.e., the side components) so the rigidity in the left and right directions of the present seat is improved and safety against side collision is also improved.

Furthermore, each of the pair of arms can be provided at the turning component and the arms can have front ends that move up and down with the turning of the turning component around the turning center, and the seat can further comprise a tension structure body comprising a backrest, the upper edge side of which is latched to the upper edge side of the seatback frame while the lower edge side is latched to the front end side of the arms.

With a seat configured in this manner, when load is inputted to the backrest and tension is generated at the tension structure body, the front ends of the arms move upwards due to this tension. Due to this, increases in tension acting on the tension structure body latched to the other end of the lower edge side of the arms are suppressed and the dampening ratio of the backrest increases. For this reason, the vibration and impact absorption qualities improve. In a configuration where the torsion bar is arranged at positions in the up and down directions corresponding to the upper portion of the pelvis of the seat occupant, the adhesion between the backrest and the upper body of the occupant improves so the occupant can be effectively protected at the time of a rear collision.

The seat of the second embodiment of the present comprises: a seatback frame connected to the rear end side of a seat portion frame; a seatback arm component whose rear end side is turnably supported at the seatback frame or the seat portion frame and which twists a backseat torsion bar provided at a turning center portion that moves a front end up and down due to turning; and a seatback tension structure body comprising a backrest, the upper edge side of which is latched to the upper edge side of the seatback frame while the lower edge side is latched to the front end side of the seatback arm component.

With the seat of the second embodiment of the second embodiment, when load is inputted to the backrest and tension (i.e., change) is generated at the seatback tension structure body, the seatback arm component turns and twists the seatback torsion bar while moving the front ends of the seatback arm component upwards due to this tension. Due to this, the increases in tension acting on the seatback tension structure body latched to the lower edge side of the backrest arm component are suppressed and the dampening ratio of the backrest increases. For this reason, the vibration absorption (intercept) and impact absorption qualities improve. Impact load is absorbed over time due to this large dampening ratio so the greatest load acting upon the seatback frame is alleviated, in other words, the necessary rigidity decreases (becoming a higher rigidity than the necessary rigidity) and the device can be made to be thinner and lighter. Furthermore, when the vehicle equipped with this seat experiences, for example, a rear collision, the adhesion of the backrest relative to the upper body of the seat occupant improves so the occupant can be effectively protected from rear collisions as well.

In this manner, the seat of the second embodiment of the present invention can ensure rigidity even if the seatback frame is made to be thin, and safety improves.

The seat of the first or second embodiments of the present invention can be configured to further comprise: a seat portion arm component whose bottom edge side is turnably supported at the rear portion of a seat cushion and which twists a seat portion torsion bar provided at a turning center portion due to turning; and a seat portion tension structure body whose front end side is latched to a front edge side of the seat portion frame while the rear edge side is latched to the upper edge side of the seat portion arm component, and which moves the upper edge of the seat portion arm component forwards and downwards with the tension that acts upon it accompanying seating in the seat.

When a load acts upon the seat portion and tension (i.e., change) is generated at the seat portion tension structure body, the seat portion arm component turns and twists the seat portion torsion bar and moves the upper edge of the seat portion arm component forwards and downwards. Due to this, increases in the tension acting upon the seat portion tension support body, the rear edge side of which is latched to the upper edge side of the seat portion arm component, are suppressed and the dampening effect of the seat cushion increases. For this reason, the vibration and impact absorption qualities of the overall seat improve.

The seat structure of the present invention, as explained above, can ensure rigidity of the seatback frame even if the frame is made thin, and exhibits an excellent effect in that the safety of the seat is improved.

DETAILED DESCRIPTION OF THE INVENTION

Explanations regarding the vehicle seat 10, which is the seat of the first embodiment of the present invention, will be given based on the drawings in FIGS. 1 through 3. It should be noted that each of the drawings have arrows for FR, RE, UP, LO, RI, and LE, each respectively corresponding to directions towards the front (direction of travel), rear, upper direction, lower direction and right and left directions, with the direction the vehicle, in which the vehicle seat 10 is mounted, is traveling as the standard and, hereafter, simple references to directions towards the front, back up, down, right, and left correspond to the directions shown with the above-described arrows.

Figure 1:
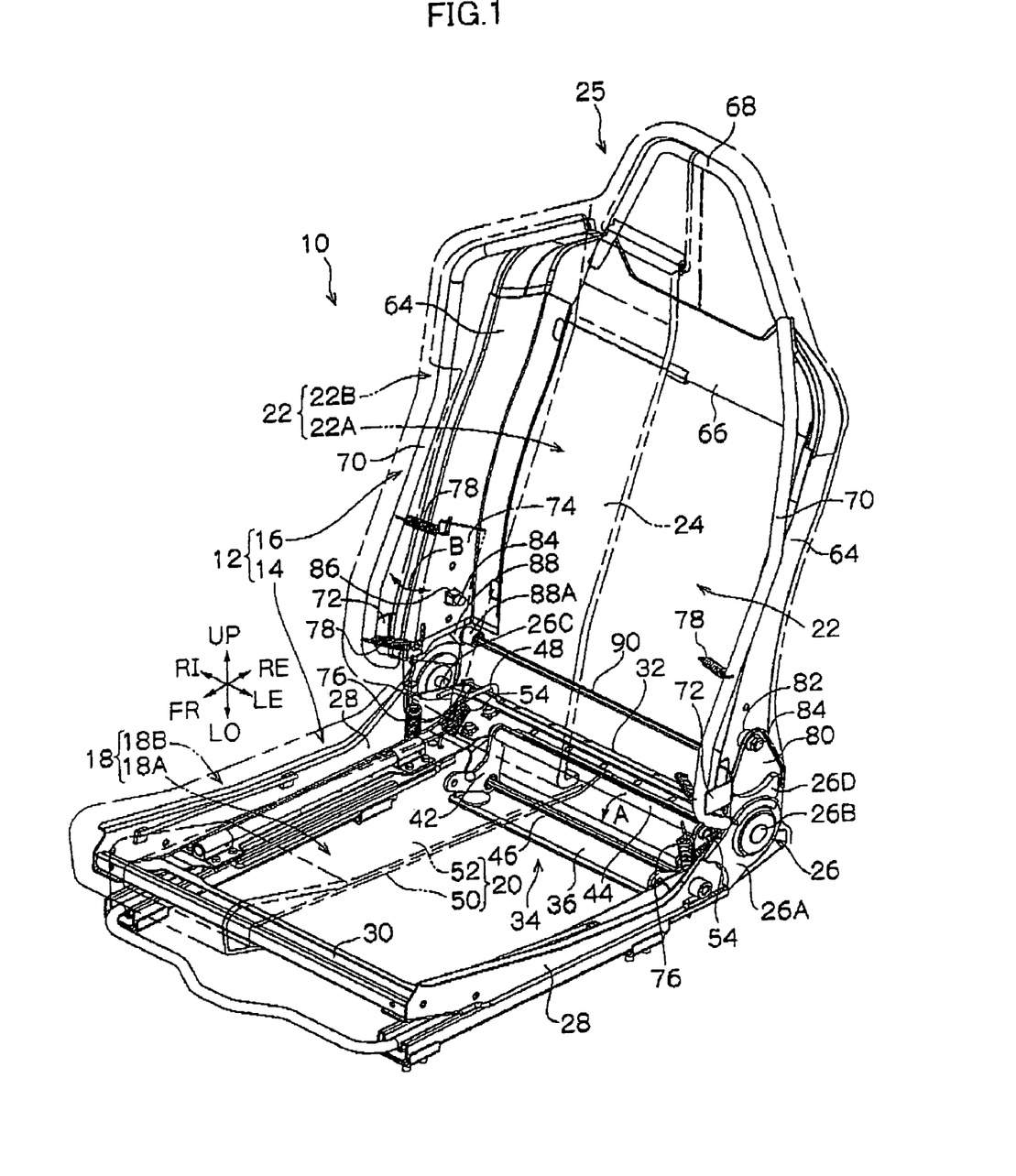
FIG. 1 is a perspective diagram showing the overall structure of the vehicle seat of the first embodiment of the present invention.

FIG. 1 shows a perspective view of the overall structure of the vehicle seat 10 with some portions cut away. As shown in this drawing, the vehicle seat 10 is provided with a seat frame 12, and the seat frame 12 is configured to have a seat portion frame 14 that is the seat cushion frame and a seat back frame 16 that is the seatback frame.

By providing a cushion material 20 at the seat portion frame 14, a seat cushion 18 acting as the seat portion is formed, and by providing a seatback cushion material 24 at the seatback frame 16, a seatback 22 acting as the back portion is formed. Further, a headrest 25 is provided on the seatback 22. The seatback 22 is connected at the lower end of the seatback frame 16 to be turnable around a support axis 26C via a reclining mechanism 26 at the rear end portion of the seat portion frame 14, thereby making it possible to maintain the turning around the axial direction relative to the seat cushion 18 and the desired turning positions.

Hereafter, explanations will be given regarding the seat cushion 18, the seatback 22, and the configuration for improving the rigidity of the seatback 22 which is the main part of the present invention, in this order.

[Structure of Seat Cushion]

Figure 2:
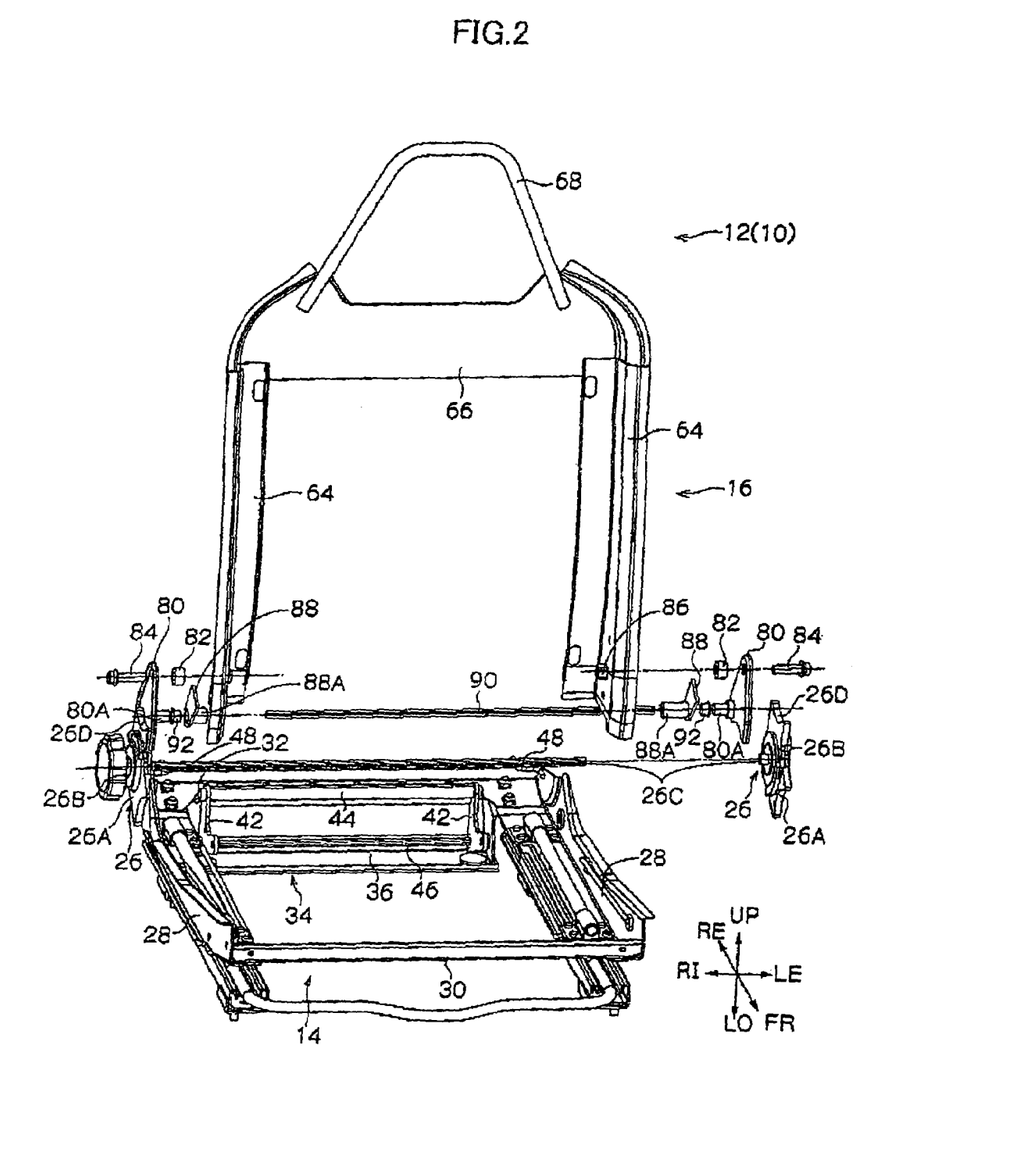
FIG. 2 is an exploded perspective diagram of the seat frame comprising the vehicle seat of the first embodiment of the present invention.
Figure 3:
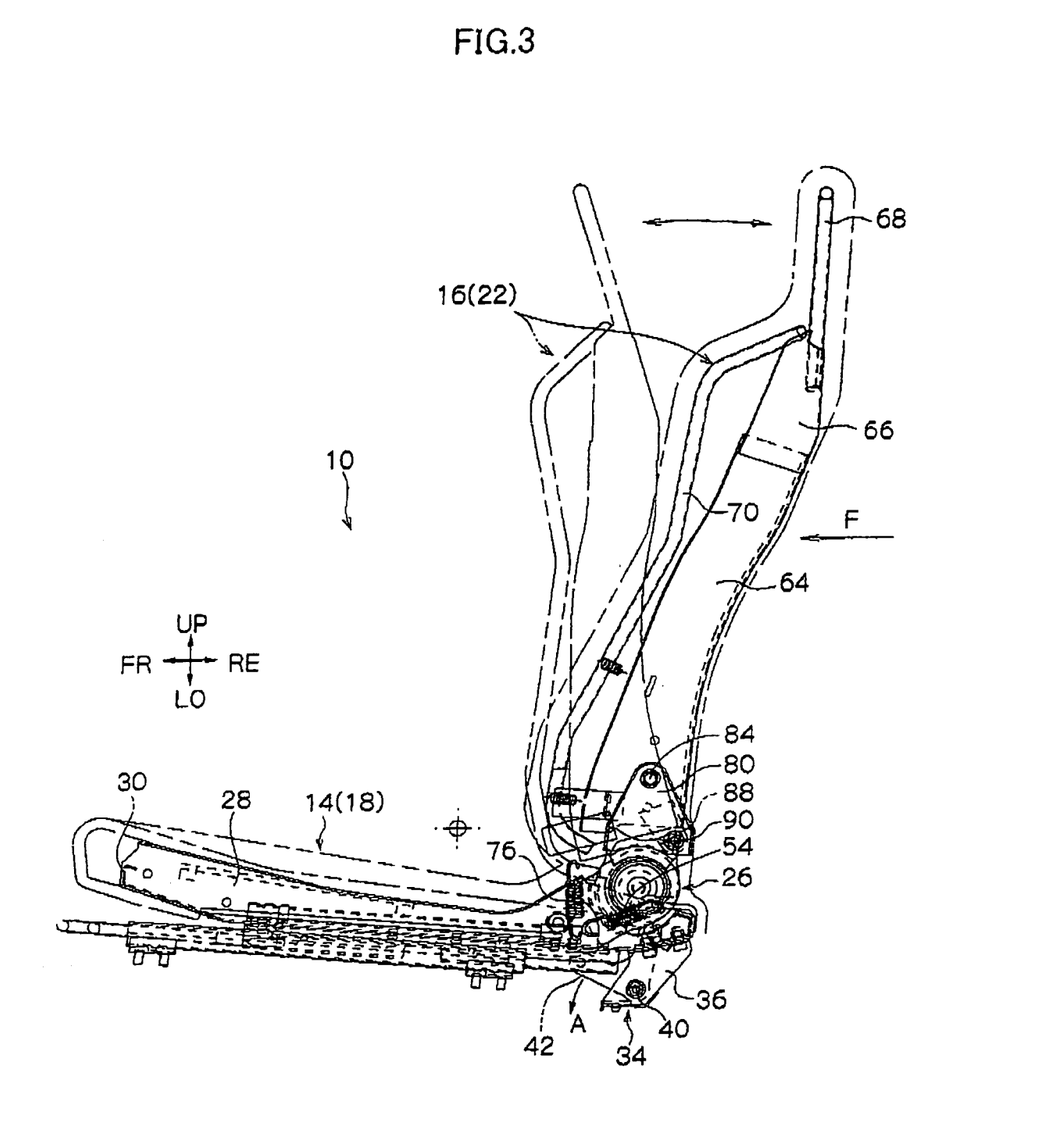
FIG. 3 is a side surface diagram of the vehicle seat of the first embodiment of the present invention.

As shown in FIGS. 1 through 3, the seat portion frame 14 that forms the seat cushion 18 is provided with a pair of side frames 28 on the left and right, each extending in the fore and aft directions. Further, the seat portion frame 14 is provided with a front frame 30 and a rear frame 32 that are respectively connected to the pair of left and right side frames 28 at the vicinities of the front and rear ends. Due to this, the seat portion frame 14 appears to be formed in a substantially rectangular shape when viewed as a flat surface.

A movable frame 34 is provided at the rear portion of the seat portion frame 14. The movable frame 34 has a pair of left and right arm components 42 provided so as to be axially supported so as to turn freely around a common axis line in the left and right directions of the bottom end portion, at the support bracket 36 fixed at the rear end portion of the seat portion frame 14. The upper portions of the pair of left and right arm components 42 are connected with a coupling pipe 44. Further, the movable frame 34 is provided with a torsion bar 46 set along the turning axis of the pair of left and right arm components 42. The torsion bar 46 is connected such that rotation of one end thereof relative to the seat portion frame 14 is obstructed, and the other end coaxially and uniformly rotates with each of the arm components 42 (i.e., the coupling pipe 44). Due to this, the torsion bar 46, which is an elastic component that generates twist load proportionate to the twist angle, has an elastically twistable configuration that accompanies the turning (i.e., oscillation) of the arm components 42.

Furthermore, spring rack components 48 are provided at each of the ends in the left and right directions at the rear end portion of the seat portion frame 14. Each of the spring rack components 48 is fixedly connected to each of the rear frame 32 and the rear portion of the corresponding side frame 28 (i.e., reclining mechanism 26).

A cushion material 20 is provided at the above-explained seat portion frame 14, thus forming the seat cushion 18. As shown with the imaginary lines in FIG. 1, the cushion material 20 is made with a two-layer composition having an under-layer sheet 50 and upper-layer sheet 52. With the first embodiments the under-layer sheet 50 and upper-layer sheet 52 are respectively made to comprise a three-dimensional knit (i.e., net) structure. Extension of the surface direction that accompanies internal damping with tension, collapsing in the thickness direction, and recovery with the removal of the tension is made possible. Further, with the first embodiment of the present invention, the under-layer sheet 50 is made to have a hard spring quality making it difficult to extend both front and back and left and right, and the upper-layer sheet 52 is made to have a soft spring quality making it easy to extend in the left and right directions while having a hard spring quality making it difficult to extend in the front and back directions.

The front edge portion of the under-layer sheet 50 is wrapped around the front frame 30 and latched thereto while the rear edge portion is latched to the coupling pipe 44 of the movable frame 34. Due to this configuration, the rear end of the under-layer sheet 50 follows the turning of the arm components 42 and is made to be movable, and the arm components 42 are made to turn in the direction of the A arrow when someone sits in the seat, whereby increase in tension is suppressed while it flexes in the down direction.

Further, both edges in the left and right directions at the rear end side of the under-layer sheet 50 are respectively latched to the front edge of the tension-coil spring 54 latched to the spring rack components 48. Each of the tension-coil springs 54 extend with the flexing of the under-layer sheet 50 in the lower direction that accompanies someone sitting in the seat, front and back direction tension is generated at the under-layer sheet 50 at the portions further to the outer sides of the pelvis of the person sitting to the left and right, and this is configured so as to generate high tension at the under-layer sheet 50 at the portions that support the thighs (i.e., the body side) of the seated person.

Due to the above, the under-layer sheet 50 is configured so that the place of tension produced is a three-dimensional tension direction with the movable frame 34 (torsion bar 46) which is a two-dimensional spring element forming the planar place of tension and with the left and right tension-coil springs 54 which are each one-dimensional spring elements forming the tension line.

On the other hand, the upper-layer sheet 52 is provided so as to stretch on the seat portion frame 14 at the upper side of the under-layer sheet 50. Specifically, the upper-layer sheet 52 is latched to upper flange portions of the side frames 28 that correspond to hook portions provided at both ends to the left and right, and the hook portions provided along the front edge in the left to right directions are latched to the front frame 30 so as to wrap around the front frame 30. The rear end of the upper-layer sheet 52 is fixedly connected to the bottom end of the seatback cushion material 24 of the seatback 22, however, it is almost entirely in the state of a free end. That is, the upper-layer sheet 52 is independent from the under-layer sheet 50 and provided so as to be stretched on the seat portion frame 14.

The rear portion of this upper-layer sheet 52 is directly layered on the under-layer sheet 50 and the portions wrapped around the front portion and the front side of the front frame 30 is formed in a protruding shape with a spacer component made of polyurethane foam and the like set between it and the under-layer sheet 50. Further, the rear portion of the upper-layer sheet 52 barely presses upon the rear portion of the under-layer sheet 50 in the down direction and turns the torsion bar 46 slightly in the direction of the A arrow, thereby lowering the tension of the under-layer sheet 50 when no one is seated.

The seat cushion 18 is configured such that the covering surface material of the side supports 18B formed at both outer sides of the left and right directions of the seat surface 18A covers the latching portion of the side frame 28 of the upper-layer sheet 52. The side supports 18B are formed such that the aforementioned covering surface material covers the edge portions of the upper-layer sheet 52 in the left and right directions and the cushion component provided on the flange portion of the side frame 28.

The seat cushion 18 configured as described above is made such that basically the under-layer sheet 50 provides the main support of the weight of the seated person while the upper-layer sheet 52 supports a part of the weight of the seated person. Further, with the under-layer sheet 50, tension from mainly the torsion bar 46 supports the weight of the seated person and the tension from the tension-coil springs 54 shares in supporting the weight of the seated person. Due to the fact that the seat cushion 18 combines the upper-layer sheet 52 with the under-layer sheet 50 where the place of tension in the three-dimensional direction is formed accompanying seating as described above, as a whole, the seat conforms to (matches) the compliances for a human body (the seated person) and the impedance (qualities of power transmission) of muscles that change with the degree of tension and posture or vibration, and pressure and force of constraint imparted to the seated person, the stress of pain and lack of comfort, and the like, based on the transmission of vibration are alleviated, and the accumulation of fatigue that accompanies sitting for long periods of tie can be suppressed.

[Structure of Seatback]

As shown in FIGS. 1 and 2, the seatback frame 16 has a pair of left and right seatback side frames 64 acting as the side frames in the present invention, and an upper frame 66 that crosses between the upper ends of the left and right seatback side frames 64, and the seatback frame 16, as a whole, is formed so that the downward area is open. Further, with the first embodiment, a headrest frame 68 that forms a headrest 25 is fixedly attached to the upper frame 66. In the first embodiment, the thickness of the seatback frame 16 in the front and rear direction is relatively small thus providing what is known as a thin frame.

This seatback frame 16 is linked to the seat portion frame 14 via the reclining mechanism 26 as described above. The reclining mechanism 26 is configured so as to have a base 26A fixed and attached to the rear end portion of the side frame 28 and a tilting arm 26D, which is connected via an axis support unit 26B to the rear ends of each base 26A so as to be turnable around a support axis 26C following the left and right directions and to be able to maintain optional turning positions.

The pair of left and right tilting arms 26D are made so as to be fixed via attaching components 80 to the bottom portions of their respectively corresponding seatback side frames 64. Specifically, the configuration is that a bolt 84, which passes through an attaching component 80 adhered by welding and the like to the tilting arm 26D, a spacer 82, and the seatback side frames 64, in this order, from the outer side of the seat towards the inner side, is screwed into a weld nut 86 adhered to the inner surface of the seatback side frame 64, whereby the seat back frame 16 is connected to the seat portion frame 14 via the reclining mechanism 26 such that it can be tilted.

This seat portion frame 14 (i.e., seat cushion 18) and reclining mechanism 26 correspond to, in the present invention, the "seat portion" and the "rear end side of the seat portion". It should be noted that a torsion bar 90 is provided between the reclining mechanism 26 and seatback frame 16 and this will be described later.

Furthermore, the seatback frame 16 is provided with a pair of left and right support pipes 70. Each support pipe 70 protrudes more towards the front from the seatback side frame 64 as a whole, with the areas that correspond to the shoulder and lumbar regions of the seated person especially protruding forward. The upper end portions of each of the support pipes 70 bent towards the inner side of the seat and the rear side are fixed to the upper frame 66 while the vicinities of the lower ends are elastically connected to the lower end vicinities of the seatback side frames 64 via board spring-shaped brackets 72.

That is, the lower ends of each support pipe 70 are supported with lower rigidity than the upper ends adhered to the upper frame 66. Further, the spacers 82 provided between the above attaching component 80 (i.e., reclining mechanism 26) are formed from an elastic material such as rubber, whereby each of the seatback side frames 64 are respectively independent and can be displaced in the direction of the B arrows shown in FIG. 1. Furthermore, each of the above support pipes 70 attached to each of the seatback side frames 64 are independent of each other and can rock around the upper end side around the front and back and in the left and right directions.

Due to the above, the seatback frame 16 is made to be an elastic structure, and a seatback cushion material 24 is provided at this seatback frame 16, thereby forming the seatback 22. In the present embodiment, the seatback cushion material 24 is configured to form a backrest 22A with a single layer. This seatback cushion material 24 comprises a tension structure having a hard-spring characteristic in that it does not easily extend in the up and down direction and also the left and right direction. This tension structure can be a two-dimensional textile (e.g., cloth spring material) or a three-dimensional knitted fabric.

With the first embodiment, the upper end side of the seatback cushion material 24 is latched to the upper portions of the left and right support pipes 70, while the portions from the middle portion in the up and down directions to the lower end are respectively latched to the front edge of the seatback side frames 64. Further, the upper edges of the tension-coil spring 76 latched with the lower edge to the rear edge portion of the seat portion frame 14 are latched to both left and right edge portions at the lower edge of the seatback cushion material 24. Further, one end of a fabric 74 is attached respectively to both the left and right sides at the lower part of the seatback cushion material 24, and the other end of the tension-coil spring 78 latched to the support pipes 70 is latched to the other end of the fabric 74.

The seatback cushion material 24 is linked with the rear end of the seatback side frames 64 via the respective attached areas of the fabric 74 and forms a substantially level backrest 22A when the seat is in a state where no one is sitting in it. Further, the portions from both the left and right side portions to the support pipes 70 that are further to the outside of the seat than the attached areas of the fabric 74 of the seatback cushion material 24 are covered by a cushion material and covering material thus forming the side support 22B.

The above-explained seatback 22 improves the outer appearance while continuing to guarantee the flatness of the backrest 22A when the seat is in a state where no one is sitting in it, and the tension direction at the seatback cushion material 24 when the seat is in a state where someone is sitting in it is made to be three-dimensional due to the tension-coil springs 76, 78, and like the seat cushion 18, this is configured so that matching of impedance and compliance with muscle change at any time can be assured in a timely manner, and the accumulation of fatigue that accompanies sitting for long periods of time can be suppressed.

[Structure Improving the Rigidity of the Seatback]

The vehicle seat 10 is provided with a torsion bar 90 that acts as the "elastic component" or "back portion torsion bar" of the present invention provided between the reclining mechanism 26 (i.e., seat portion frame 14) and the seatback frame 16, and this torsion bar 90 is made so as to resist deformation of the seatback frame 16 and improve the rigidity of the seatback frame 16. Detailed explanations will be given hereafter.

As shown in FIGS. 1 and 2, support components 88 are fixed with welding or the like to the respective bottom end rear portions of each of the seatback side frames 64 forming the seat back frame 16 and each support component 88, together with the left and right seatback side frames 64, correspond to the "pair of left and right side frames" in the present invention. Bosses 88A are formed at the bottom ends of each of these support components 88. Meanwhile, support axes 80A provided so as to protrude towards the interior side of the seat from the bottom rear ends of each of the attaching components 80 are arranged so as to become the same axis to each other. Then each of the support components 88 inserts the support axis 80A of the corresponding attaching component 80 through a bushing 92, whereby the support components 88 are axially supported so as to turn freely relative to the attaching component 80. Due to this, prior to the binding of the attaching component 80 to the seatback side frames 64 with the bolt 84, the seatback frame 16 is turnable around the support axis 80A relative to the seat portion frame 14 (i.e., reclining mechanism 26).

One end of the torsion bar 90 passes through the boss 88A of the support component 88 of the right side and fit into the support axis 80A of the right side in a state where it does not turn, whereby relative turning with the seat portion frame 14 (i.e., reclining mechanism 26) is inhibited. On the other side, the other end of the torsion bar 90 is fit into the boss 88A of the support component 88 of the left side in a state where it does not turn, whereby it is connected so as to turn coaxially and uniformly with the support component 88 (i.e., with the seatback side frame 64 of the left side). Due to this, the seatback frame 16 displaces so as to be able to be taken down towards the front (i.e., inclined forward) as shown with the imaginary lines in FIG. 3, and the torsion bar 90 is configured so as to be able to elastically twist. It should be noted that each attaching component 80 and the seatback side frames 64 are held clamped as described above with the bolts 84 so normally there is no twisting of the torsion bar 90.

The lower end of the seatback frame 16 that is the open end crosses over along the left and right directions due to the provision of this torsion bar 90 and the seatback frame 16 becomes a closed cross-section structure, and the rigidity as a unit (of the seatback frame 16 itself) is made to be improved. Further, the lower portion framework of the seatback 22 is made to be a substantially closed cross-section structure with the rear portion of the seat portion frame 14, the reclining mechanism 26/attaching component 80, and the torsion bar 90, and thus is configured to have high rigidity. Further, when the seatback frame 16 displaces so as to incline forward, the torsion bar 90 twists and resists the displacement, whereby the seat portion frame 14 (i.e., the reclining mechanism 26), that is, the rigidity relative to the fixed portion of the vehicle body improves.

Next, the operation of the first embodiment will be explained.

A vehicle having the vehicle seat 10 configured as above, when, for example, cargo and the like is loaded on the rear seat or in the luggage compartment towards the rear of the vehicle seat 10 and when collision from the front side occurs (front collision) during travel, there are cases where this cargo collides into the seatback 22 from the rear. When cargo collides from the rear into the middle or upper portions of the seatback 22, the seatback frame 16 tends to displace so as to fall forward relative to the seat portion frame 14 due to this impact force.

At this time, if the impact force is great, the seatback frame 16 displaces so as to fall forward relative to the seat portion frame 14 with the through-areas (i.e., connecting portions) of the bolts 84 at the seatback side frames 64 or with the attaching component 80 continuing to fracture or break, or with the arbitrary plastic deformation of the seatback frame 16 itself. At this time, the tuning center of the seatback frame 16 is not necessarily the support axis 80A (i.e., during the period of turning, it is not limited to one constant position), however, twisting force acts upon the torsion bar 90 due to the displacement of this seatback frame 16 relative to the seat portion frame 14, and the torsion bar 90 twists. The force necessary for the elastic deformation of this torsion bar 90 resists the displacement of the seatback frame 16 and the torsion bar 90 works to maintain the shape and position of the seatback frame 16. In other words, by providing this torsion bar 90, the rigidity of the seatback frame 16 improves.

The shock force that accompanies collision of cargo at the back surface side of the seatback 22 is absorbed by the twisting of this torsion bar 90, or the twisting and plastic deformation of the seatback frame 16 (with the breaking of the clamped portions of the above-described bolts). At this time, the upper end of the seatback cushion material 24 approaches the lower end (i.e., tension slackens) with the above-described displacement that knocks the seatback frame 16 forward. For this reason, the amount of flexure per unit of load of the backrest 22A becomes greater (i.e., an amount of flexure is generated) and the load acting on the seat occupant is alleviated.

Further, after the absorption of shock, the seatback frame 16 displaces so as to rise up relative to the seat portion frame 14 due to the recovery force of the torsion bar 90. Due to this, the shock force that accompanies collision of cargo that would otherwise be conveyed as is to the seated person with a conventional thick seat is not conveyed when using the vehicle seat 10 and, on the other hand, unlike a thin, highly elastic seat where the back portion frame only simply plasticize deforms and rigidity is insufficient, and the survival space of the seated person cannot be ensured, the person seated in the vehicle seat 10 is protected. In other words, the safety of the seat is improved.

Furthermore, this is not limited to the above-described situation involving frontal collision, but also, during a rear collision, where, for example, the lock of the reclining mechanism 26 is broken due to impact and becomes inoperable, the seatback frame 16 (from the center portion to the upper portion of the seatback 22) can be stood up from a state of front inclination or rear inclination so that, not only is the survival space of the person seated in the vehicle seat 10 ensured, but an escape space for those riding in the back seat can also be guaranteed. Further, when the seat occupant is pressed against the seatback 22 at the time of rear collision, by providing the torsion bar 90 that crosses over between the left and right seatback side frames 64 (support components 88), the rigidity of the lower end framework of the seatback 22 is improved so movement towards the rear of the pelvis region (lumbar region) of the seated person can be effectively contained. In other words, over-displacement of the lumbar area of the seat occupant caused by insufficient rigidity of the seat frame 12 is prevented. The seatback 22 configured so that the seatback cushion material 24 that is the tension structure body is stretched and provided on the seat frame 12 (mainly the seatback frame 16) elastically via the tension-coil springs 76, 78 has high adherence relative to the seated person, so the impact load that works upon the seated person is alleviated by suppression of the displacement of the pelvic region of the seat occupant, while changes in position are suppressed, and protection of the seat occupant at the time of collision can be achieved. As described above, safety against rear collision is improved.

Furthermore, since the torsion bar 90 is arranged to cross over the pair of left and right seatback side frames 64 (attaching component 80) the rigidity of the left and right directions at the lower portion of the seatback 22 is improved. For this reason, when, for example, a side collision occurs in a vehicle equipped with the vehicle seat 10, a survival space for the seated occupant in the widthwise direction of the seat is also ensured so the safely against side collision also improves.

In this manner, with the vehicle seat 10 of the first embodiment of the present invention, rigidity is ensured even if the seatback frame 16 is a thin type so safety is improved.

[Second Embodiment]

Figure 4:
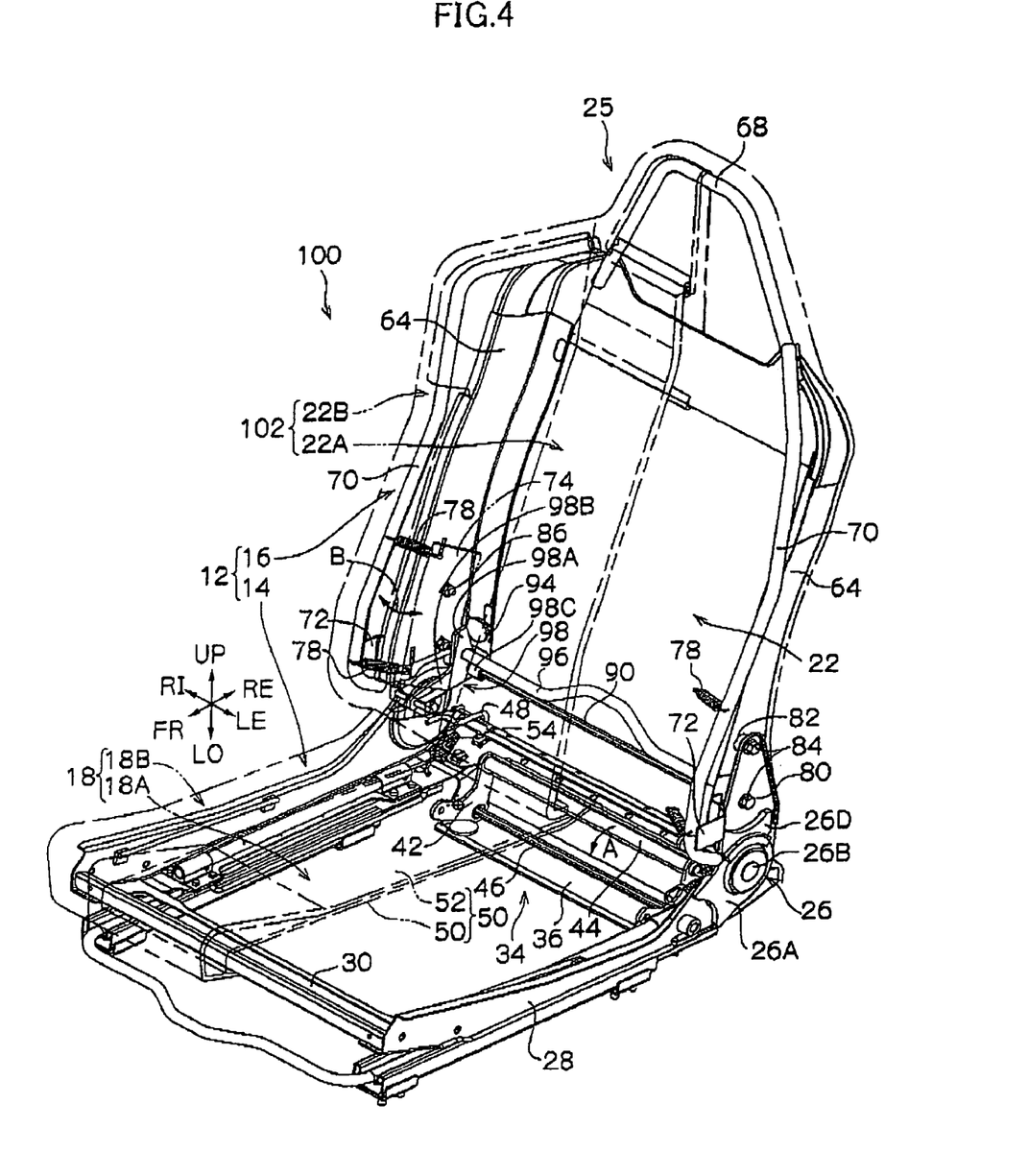
FIG. 4 is a perspective diagram showing the overall structure of the vehicle seat of the second embodiment of the present invention.

Next, explanations will be given regarding a vehicle seat 100 of the second embodiment of the present invention based on FIGS. 4 through 8. It should be noted that the parts/portions that are essentially the same as those of the above first embodiment have been given the same numbers as above and explanations thereon have been omitted The outline overall structure of the vehicle seat 100 corresponding to the perspective diagram of FIG. 1 is shown in FIG. 4, and the seat frame 12 forming the vehicle seat 100 is shown as an exploded perspective diagram in FIG. 5. As seen in these drawings, with the vehicle seat 100, the torsion bar 90 is not provided at the seatback frame 16, rather it is provided between the arm components 98 acting as the "turning component" in the present invention and attaching components 80 (seat portion frame 14), and this point differs from the vehicle seat 10 of the first embodiment. Hereafter, detailed explanations will be given.

Figure 5:
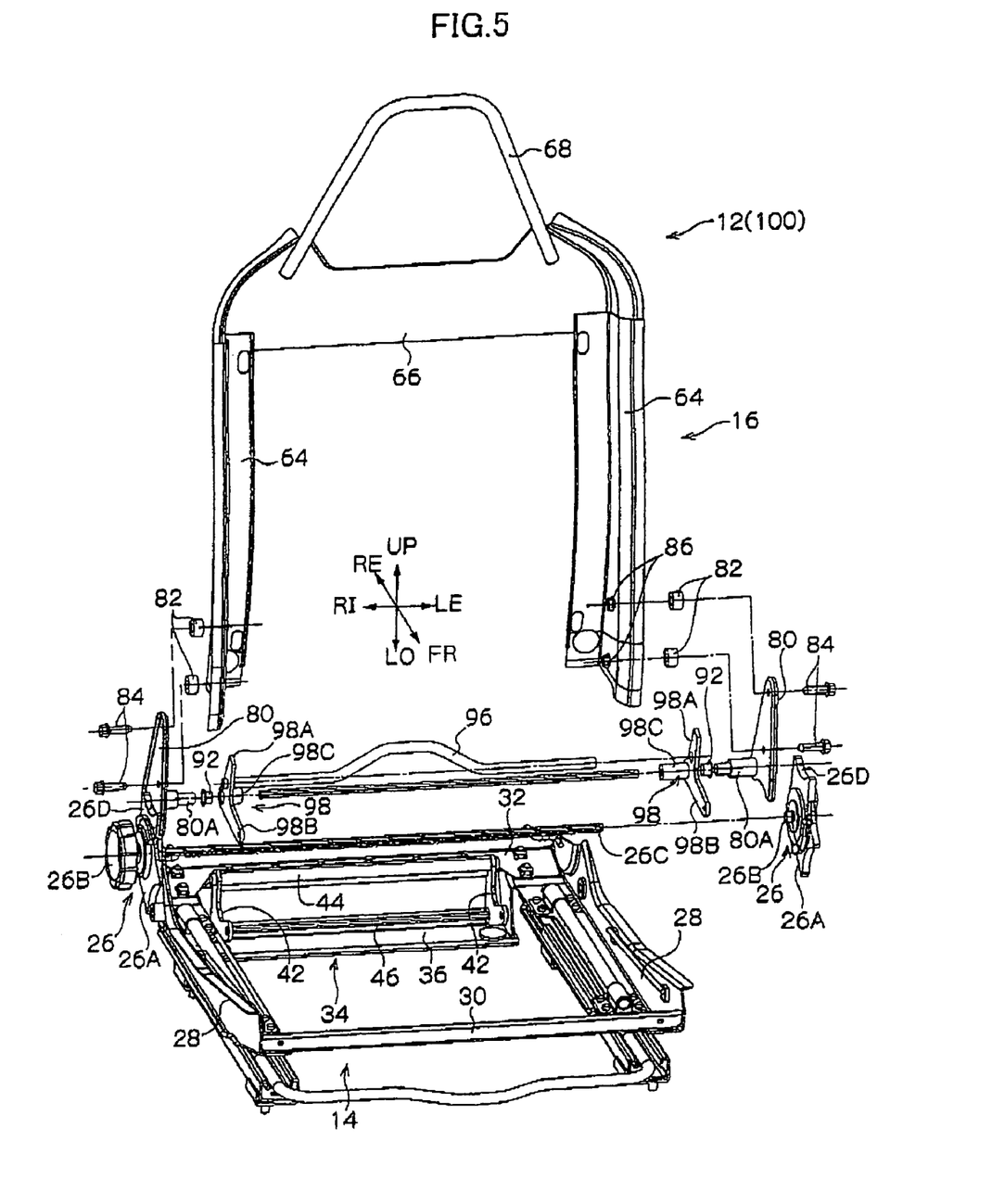
FIG. 5 is an exploded perspective diagram of the seat frame comprising the vehicle seat of the second embodiment of the present invention.

With the second embodiment, the left and right seatback side frames 64 are fixedly bound to the attaching components 80 by a pair each of a bolt 84, spacer 82, and weld nut 86, and the seatback frame 16 is attached so as to strengthen the seat portion frame 14 (reclining mechanism 26).

A pair of left and right arm components 98 are provided and these are arranged so as to each correspond to the fronts of the seatback side frames 64. Each arm component 98 has a first arm 98A and second arm 98B and, when viewed from the side, appears to be formed into an approximate L shape, and each has a formed boss 98C at the angle portion at the lower rear end thereof and a support axis 80A inserted through a bushing 92, whereby it is supported so as to turn freely relative to the attaching component 80. With the arm component 98, the first arm 98A extending upwards from the boss 98C is not locked to the seatback side frame 64, unlike the support components 88. That is, each of the arm components 98 can turn relative to the seatback frame 16. Further, the pair of left and right arm components 98 are connected by a coupling component 96 that crosses across the interval section in the longitudinal direction of each of the first arms 98A.

One end of the torsion bar 90 passes through the boss 98C of the arm component 98 of the right side and fits into the support axis 80A of the right side in a state where it does not turn, whereby relative turning with the seat portion frame 14 is inhibited. On the other side, the other end of the torsion bar 90 is fit into the boss 98C of the arm component 98 of the left side in a state where it does not turn, whereby it is connected so as to turn coaxially and uniformly with the left and right arm components 98 (i.e., with the coupling component 96). Due to this, when the arm component 98 turns around the support axis 80A, the torsion bar 90 is configured to elastically twist.

Figure 6:
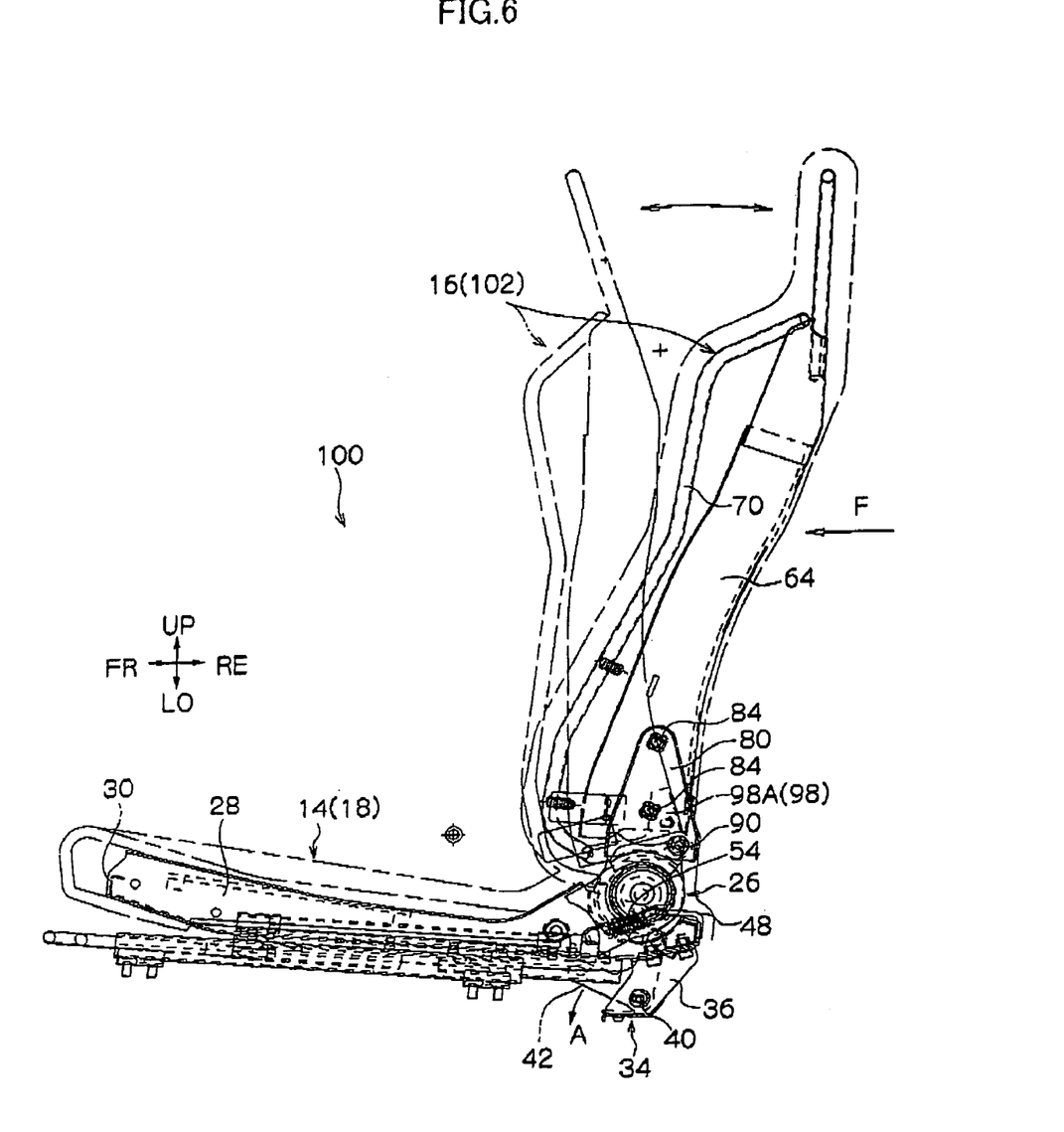
FIG. 6 is a side surface diagram of the vehicle seat of the second embodiment of the present invention.

As for the left and right arm components 98, when these are in a no-load state, play is set so that the first arms 98A are in a position where they do not contact the front of the seatback side frames 64, and the first arms 98A are put into a position where they lean slightly forward (see FIG. 6). In this state, the front tips of the second arms 98B are positioned towards the front so as to not interfere with the other portions of the seatback frame 16. For this reason, the first arms 98A of the arm components 98 are made so as to be able to turn in the direction of the C arrow and the D direction opposite the C arrow around the support axis 80A shown in FIG. 7, while the second arm 98B is made so as to be able to turn in the direction of the E arrow and direction of the F arrow opposite the E arrow. That is, the tip (i.e., front end) of the second arm 98B can move in the up and down directions due to the turning of the arm component 98 around the support axis 80A.

Figure 7:
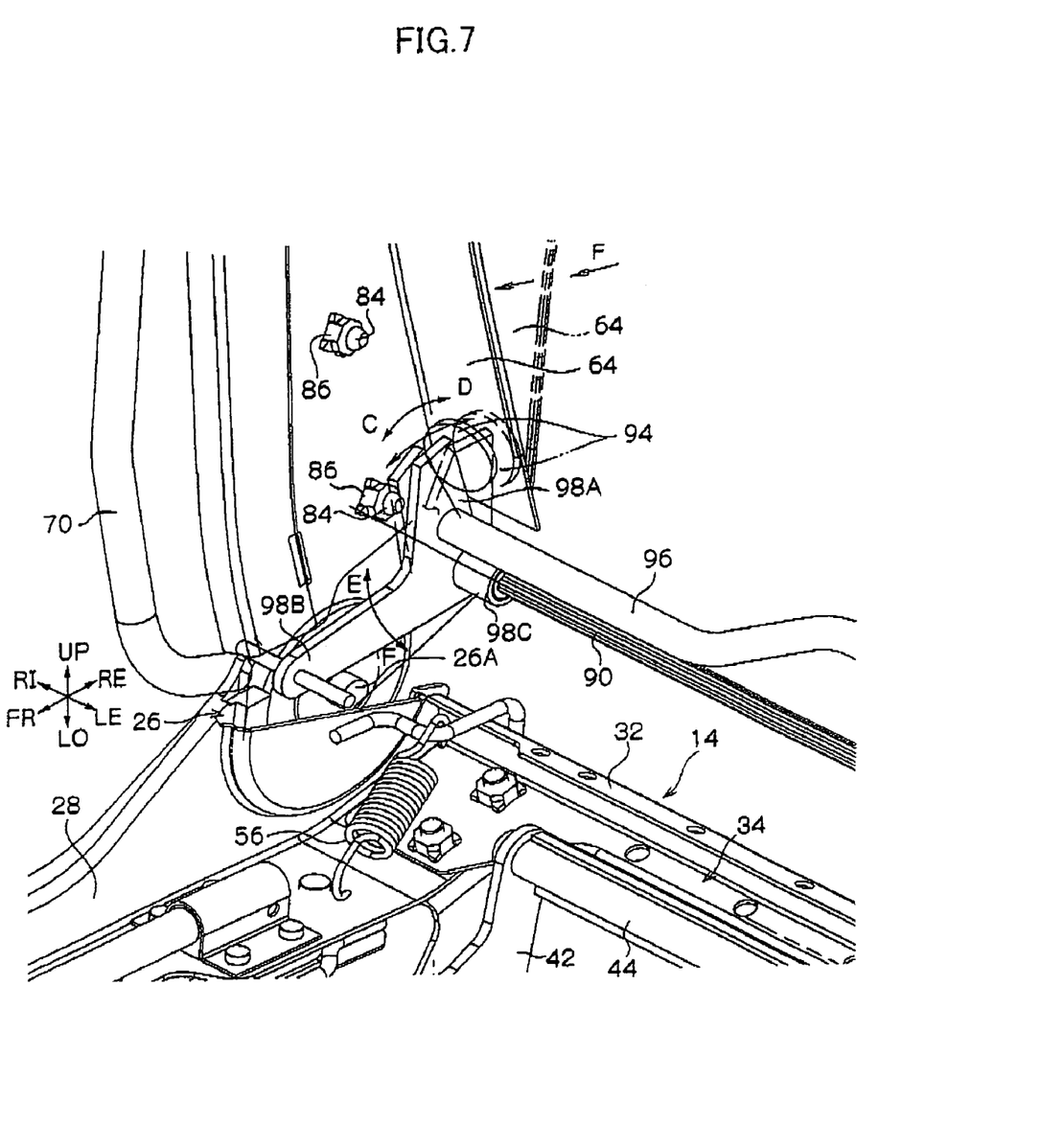
FIG. 7 is an expanded perspective diagram showing the main portions of the vehicle seat of the second embodiment of the present invention.

Next, when the seatback frame 16 receives force from the rear and displaces (i.e., further displacing after the above-described play has been expended) so as to fall forward relative to the seat portion frame 14, the front tips of the fist arms 98A of the arm components 98 press against the seatback side frames 64 and turn in the direction of the C arrow, and the torsion bar 90 is configured to elastically twist. The pad component 94 is fixed at the pressing areas of the first arms 98A at the seatback side frames 64.

Further, the coupling component 96 connected to the left and right arm components 98 can turn in the direction of the D arrow, whereby it also functions as a lumbar support that elastically supports the lumbar region of the seat occupant. Furthermore, both left and right ends at the bottom edge of the seatback cushion material 24, in place of the tension-coil spring 76, are respectively latched to the corresponding front ends of the second arms 98B of the arm components 98. That is, the torsion bar 90 acts as an elastic element in place of the tension-coil spring 76 so as to adjust the tension of the seatback cushion material 24.

Figure 8:
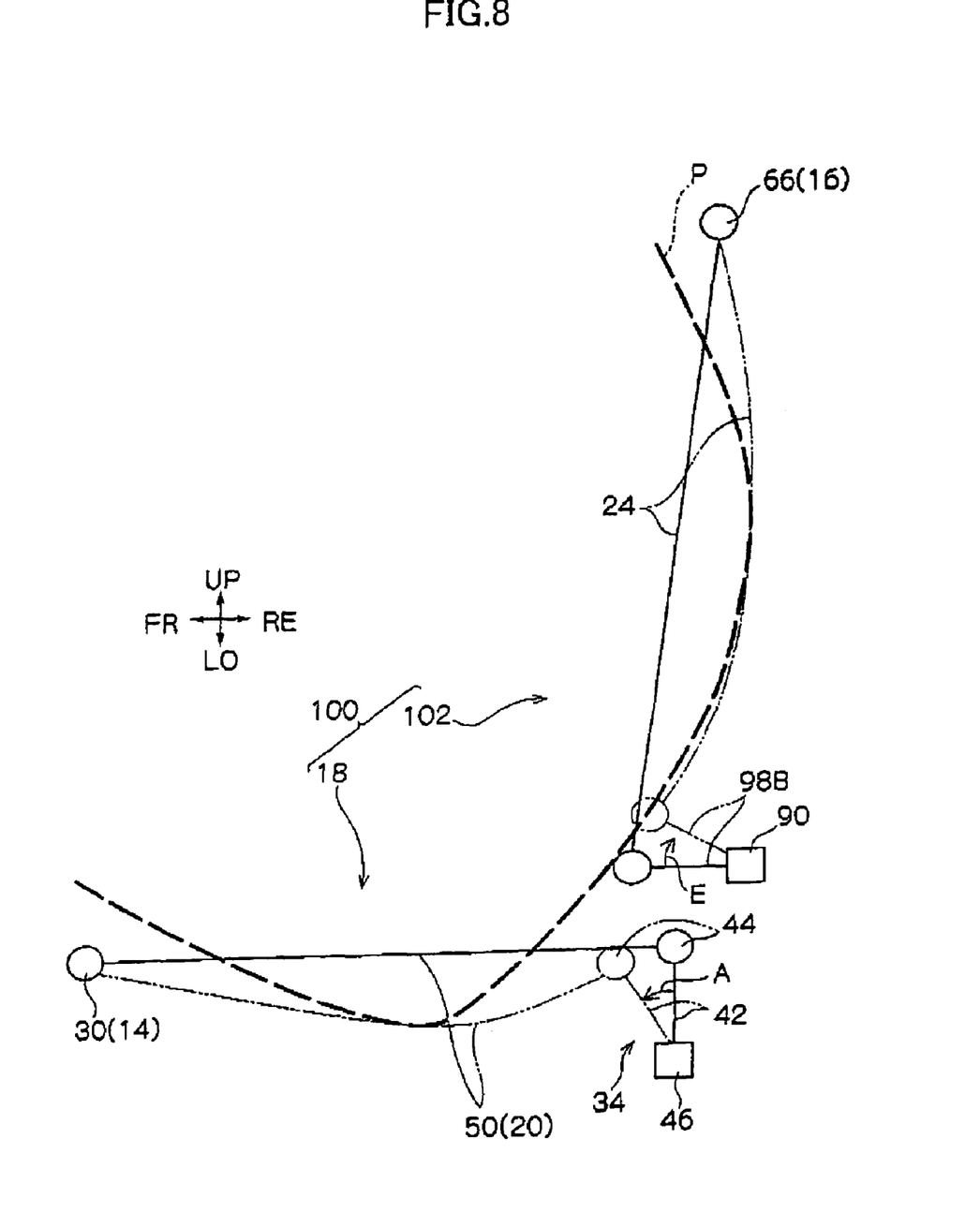
FIG. 8 is a pattern diagram showing the state of seating with the vehicle seat of the second embodiment of the present invention.

Due to this, the seatback 102 comprising the backrest 22A and the side support 22B in the vehicle seat 100, as with the seat cushion 18, moves the front tip of the second arm 98B in the direction of the E arrow (the first arm 98A turns in the direction of the D arrow), as shown in the pattern diagram in FIG. 8, with the tension of the seatback cushion material 24 when load is inputted at the backrest 22A, and it is configured so that increases in tension of the seatback cushion material 24 are suppressed. For this reason, the movement stroke of the seatback 102 towards the rear per unit of load is great, and despite configuring the seatback 102 to be provided with a thin-type seat back frame 16, sufficient movement space for the seat occupant at the time of rear collision and the like can be ensured towards the rear of the seat. In other words, the greatest load acting upon the seatback frame 16 at the time of impact absorption is reduced, and the desired rigidity for the seatback frame 16 is fulfilled while achieving thinning and lightening. Further, with this seatback 102, the adherence of the seatback cushion material 24 to the upper body of the seated occupant is better than the seatback 22.

Other structures of the vehicle seat 100 of the second embodiment are the same as the structures corresponding to the vehicle seat 10.

Next, the operation of the second embodiment will be explained.

With the vehicle seat 100 configured as described above, the cushion material 20 and seatback cushion material 24 twist the torsion bars 46, 90 respectively in the directions of the A and E arrows with the tension accompanying sitting in the seat, whereby increases in tension are suppressed while flexing in the down and rear directions.

For this reason, the backrest 22A (i.e., seatback cushion material 24) changes the shape to a three-dimensional shape that responds to the upper body of the seat occupant and, due to the soft structure, adheres and supports so as to wrap around the seat occupant. Next, since the tension of the backrest 22A in a seated state is small, the vibratory dampening ratio of the seatback 102 (the vehicle seat 10) including the seat occupant is great, so the vibration conveyed to the seat occupant from the seatback 102 is effectively absorbed. That is, with the seatback 102, vibrations due to hammering of the seatback cushion material 24 (backrest 22A) are lowered and the vibration conveyed to the head area of the seat occupant is reduced. Further, body movement of the seat occupant that accompanies breathing is allowed (i.e., absorbed) due to the deformation of the seatback cushion material 24. In particular, the portions that contact the protruding portions of the human body (the lumbar area and shoulder blades), to which load is focused and vibration tends to be conveyed at the backrest 22A, are characterized in that the number of springs are greatly reduced in comparison with the surrounding regions (what is known as a "zero-springs characteristic"), and since the dampening ratio is large, the vibration blocking effects and body movement compliance effects are great, and the backrest 22A as a whole provides sufficient recovery power due to the torsion bar 90 and the continued maintenance of the above large dampening ratio. Accordingly, the burden on the seated occupant is reduced and the seating comfort is improved and stress is also reduced when sitting for long periods of time.

Meanwhile, at the seat cushion 18, increases in tension in the under-layer sheet 50 that accompany seating at the seat cushion 18 are suppressed so the vibratory dampening ratio including the seated occupant is great, so good absorption of vibration and impact is achieved. Due to this, the accumulation of fatigue that accompanies sitting for long periods of time is suppressed with the seat cushion 18. What is especially notable is that with the seat cushion 18, the cushion material 20 is configured to include the under-layer sheet 50 and the upper-layer sheet 52, which are three-dimensionally knitted fabrics, and the rear edge of the under-layer sheet 50 is elastically connected to the rear edge of the seat portion frame 14 through the movable frame 34 (i.e., torsion bar 46), so there is no inhibition of movement of the tailbone that accompanies the breathing of the seated occupant (i.e., minute movements of the tailbone are complied to with hardly no occurrence of resistance force against the movements). That is, as with the seatback 102, a zero-springs characteristic and sufficient recovery force due to the torsion bar 46 can also be obtained with the seat cushion 18. It should be noted that explanations involving operations of the seat cushion 18 that are the same as in the vehicle seat 10 of the first embodiment have been omitted.

With the vehicle seat 100, the accumulation of fatigue, that is, the accumulation of stress such as pain and lack of comfort that cause fatigue for the seat occupant during normal sitting time (i.e., when the vehicle is stopped or during travel) are markedly suppressed by each function of the seatback 102 and the seat cushion 18 as described above.

Also, when the vehicle collides from the front side, there is a tendency for the seat occupant who is the driver to press the gripped steering wheel forward and to lock their arms out of fear just prior to collision. When the vehicle seat 100 is equipped in a vehicle as the driver's seat, due to the driver locking their arms, the upper body of the seat occupant who is the driver presses against the backrest 22A (towards the rear). When this happens, the seatback cushion material 24 turns the arm components 98 in the direction of the E arrow (D arrow) with the tension, and increases in the tension are suppressed while the seatback cushion material 24 flexes greatly towards the rear due to the twisting of the torsion bar 90.

When frontal collision occurs at the vehicle in this state, the upper body of the seat occupant shakes to tilt forward. At this time, the seatback 102 (seatback frame 16) moves so as to tilt forward the same as the upper body of the seat occupant and the backrest 22A (seatback cushion material 24) adheres closely to the back surface of the seat occupant. In this manner, adhesion between the seat occupant and the seatback 102 improves so the pressure supporting the seat occupant during frontal collision increases and safety is improved. The same operational effect is essentially achieved when the vehicle seat 100 is applied to seats other than the driver seat.

When cargo is loaded on the rear seat or in the luggage compartment at the rear of the vehicle seat 100 (also not limited to the driver's seat) and when frontal collision occurs during travel, there are cases where this cargo collides into the seatback 102 from the rear. When cargo collides from the rear into the middle or upper portions of the seatback 102, the seatback frame 16 displaces so as to fall forward relative to the seat portion frame 14 due to this impact force.

At this time, if the force of impact is great, the seatback frame 16 displaces so as to fall forward relative to the seat portion frame 14 with the through-areas of the seatback side frame 64 or the bolt 84 of the attaching component 80 continuing to fracture or break, or with the arbitrary plastic deformation of the seatback frame 16 itself. Then when the pad component 94 of the seatback side frame 64 contacts the front end of the first arm 98A of the arm component 98, the aim component 98 turns in the direction of the C arrow due to the further displacement towards the falling forward of the seatback frame 16, and the torsion bar 90 twists. The force necessary for the elastic deformation of this torsion bar 90 resists the displacement of the seatback frame 16 and the torsion bar 90 works to maintain the shape and position of the seatback frame 16. In other words, by providing this torsion bar 90, the rigidity of the seatback frame 16 improves.

The shock force that accompanies collision of cargo and the like at the back surface side of the seatback 102 is absorbed by the twisting of this torsion bar 90 and the plastic deformation of the seatback frame 16 (with the breaking of the clamped portions of the above-described bolts). At this time, the seatback frame 16 displaces so as to fall forward as described above, and the seatback cushion material 24 is pressed against the back of the seat occupant, however, the arm component 98 turns further towards the direction of the E arrow due to the tension working on the seatback cushion material 24 accompanying this pressing, the front tip of the second arm 98B moves to the upper side, and increases in the tension of the seatback cushion material 24 are suppressed. For this reason, the amount of flexure per unit of load of the backrest 22A becomes greater (i.e., an amount of flexure is generated) and the load acting on the seat occupant from the seatback 102 is dampened or alleviated.

Further, after the absorption of impact, the seatback frame 16 displaces so as to rise up relative to the seat portion frame 14 due to the recovery force of the torsion bar 90. Due to this, the force of impact that accompanies collision of cargo that would otherwise be conveyed as is to the seat occupant with a conventional thick seat is not conveyed when using the vehicle seat 100 and, unlike a thin highly elastic seat where the back portion frame simply plasticize deforms and rigidity is insufficient so that the survival space of the seat occupant cannot be ensured, the seat occupant in the vehicle seat 100 is protected. In other words, the safety of the seat is improved.

Furthermore, this is not limited to the above-described situation involving frontal collision and, during a rear collision, the seat occupant moves towards the rear at the beginning of impact, however, the dampening ratio of the backrest 22A is great, as described above, so the impact load is effectively absorbed with the passage of time. Further, after, for example, a rear collision when the lock of the reclining mechanism 26 is broken due to impact and becomes inoperable, the seatback frame 16 (from the center portion to the upper portion of the seatback 102) can be stood up from a state of front inclination or rear inclination, so that, not only is the survival space of the seat occupant in the vehicle seat 10 ensured, but an escape space for those riding in the back seat can also be guaranteed. Further, when the seated person is pressed against the seatback 102 at the time of rear collision, by providing the torsion bar 90 that crosses over between the left and right seatback side frames 64 (arm components 98) the rigidity of the lower end framework of the seatback 102 is improved, so movement towards the rear of the pelvis region (i.e., lumbar portion) of the seat occupant can be effectively contained. In other words, over-displacement of the lumbar portion of the seat occupant caused by insufficient rigidity of the seat frame 12 is prevented. The seatback 102 configured so that the seatback cushion material 24 that is the tension structure body is stretched and provided on the seat frame 12 (i.e., mainly at the seat back frame 16) elastically via the tension-coil springs 78 and arm components 98 has high adherence relative to the seat occupant so the impact load that works upon the person is alleviated even better by suppressing the displacement of the pelvic region of the seat occupant while changes in position are suppressed, so that protection of the seat occupant at the time of collision can be achieved. As described above, safety against rear collision is improved.

Furthermore, the left and right arm components 98 turn and twist the torsion bar 90 and are connected to the coupling component 96 so even if impact force is inputted to either the left or right of the seatback side frames 64 from the rear, the torsion bar 90 remains stable and twists so impact absorption and recovery perform well. That is, improvement of the rigidity of the seatback frame 16 is contributed to with certainty.

Furthermore, since the torsion bar 90 is arranged to cross over the pair of left and right seatback side frames 64 (attaching components 80), the rigidity of the left and right directions at the lower portion of the seatback 102 is improved. For this reason, when, for example, a side collision occurs in a vehicle equipped with the vehicle seat 100, a survival space for the seated occupant in the widthwise direction of the seat is also ensured so the safety against side collision also improves.

In this manner, with the vehicle seat 100 of the second embodiment of the present invention, rigidity is ensured even if the seatback frame 16 is a thin type so safety is improved. Further, by providing the arm components 98 between the seatback frame 16 and the seat portion frame 14 (reclining mechanism 26), the play between from the initiation of displacement of the seat back frame 16 to the initiation of the twisting deformation of the torsion bar 90 can be set, so impact absorption qualities can be easily set with this play (i.e., impact absorption stroke and time).

The above second embodiment of the present invention was configured to be provided with the arm components 98 acting as a turning component; however, the present invention is not thus limited, and can be configured in any manner, as long as the turning component turns with the displacement of the seatback frame 16 and makes the elastic component deform.

It should be noted that in each of the above embodiments, examples of a configuration have been explained where the seatback frame 16 is fixed to the reclining mechanism 26 (attaching component 80) with the bolt 84 and the like; however, the present invention is not thus limited and, for example, the vehicle seat 10 of the first embodiment can be configured so that no bolts 84 are provided. With this configuration, when the seat occupant is shaken so as to tilt forward at the time of frontal collision, the seatback 22 turns around the support axis 80A (torsion bar 90) due to the impact (inertia) and follows the upper body of the seat occupant. For this reason, the adhesion between the seatback 22 and the seat occupant during frontal collision is further improved and effective protection of the seat occupant is achieved. Further, if, for example, a releasable lock mechanism is provided between the seatback frame 16 and the reclining mechanism 26 (seat portion frame 14) in place of the bolts 84, it becomes possible to selectively switch between a state where the seatback frame 16 and reclining mechanism 26 are fixed and a state where the seatback frame 16 can turn while twisting the torsion bar 90. With this configuration, when, for example, the seat occupant who is a driver places emphasis on handling stability, the seatback frame 16 can be fixed with the lock mechanism; when the driver places importance on vibration absorption, the lock mechanism can be released and the seatback frame 16 made to be allowed to turn. When selecting the latter (the same is true for a configuration where the above lock mechanism and the bolt 84 are not provided), a zero-springs characteristic such as that found in the seatback 102 of the above second embodiment are achieved from the seatback frame 16 inclining towards the rear while the torsion bar 90 continues to twist with the seating, whereby the configuration becomes one where even if the seatback frame 16 itself vibrates, the vibration is not conveyed to the seat occupant. Due to this, when vital signs that can be detected with a seating sensor (e.g., biological data such as breathing and pulse waves) are detected, the adverse effects of vibration can be eliminated, thus facilitating the detection. Further, even after, for example, a frontal vehicular collision where the lock of the reclining mechanism 26 is broken and becomes inoperable, the seatback 22 can be stood up easily so an escape space for the seat occupant or for those riding in back can be guaranteed with certainty.

Further, in each of the above embodiments, the preferred configuration is one where the torsion bar 90 is provided to act as the elastic component, however, the present invention is not limited to this, but, for example, a configuration can also be applied where a twisting coil spring or a board spring and the like is provided to act as the elastic component.

Further, in each of the above embodiments, it is preferred that the vehicle seats 10, 100 have the reclining mechanism 26; however, the present invention is not limited by such configurations or by whether the reclining mechanism 26 is provided or not.

Furthermore, in each of the above embodiments, the preferred configuration is one where the cushion material 20 (i.e., under-layer sheet 50 and upper-layer sheet 52) and the seatback cushion material 24 that are the tension structure body are elastically provided to stretch at the seat frame 12; however, the present invention is not limited to this, and as long as the seat is provided with an elastic component between the back portion frame and the seat portion side component in order to improve rigidity and/or tension adjustment (i.e., dampening ratio control), it can be applied to, for example, a urethane seat or the like.

Further, in each of the above embodiments, the present invention is configured to be applied to vehicle seats 10, 100, however, the present invention is not limited to this, and the present invention can be applied to, for example, all types of vehicular seats such as those for railcars, ships and vessels, airplanes and the like, or to all types of seats, such as office chairs and chairs for home furnishings.

What is claimed is:

1. A seat comprising:
   a seatback frame where a pair of left and right side frames are respectively connected to a rear end side of a seat portion; and
   an elastic component that is provided between the seatback frame and the seat portion and which resists displacement of the seatback frame relative to the seat portion, wherein
   the elastic component is a torsion bar having a first end and a second end, a longitudinal axis, and the torsion bar is fixed to the seatback frame so that it is non-rotatable about the axis relative to the seatback frame, and
   the first end of the torsion bar is fixed to one of the pair of side frames and the second end of the torsion bar is fixed to the rear end side of the seat portion at the other of the pair of side frames.

2. The seat of claim 1, wherein the torsion bar is selectively positioned in the up and down direction.

3. The seat of claim 1, further comprising with a turning component arranged so that one end is turnably supported at the rear end side of the seat portion and so as to engage the seatback frame that displaces in a front tilting direction relative to the seat portion, and wherein the elastic component is provided between the turning component and the seat portion.

4. The seat of claim 3, wherein the turning component has a pair of arms that are respectively arranged so as to be able to engage each of the side frames that displace in a front tilting direction relative to the seat portion while being connected to each other via a coupling component; and the elastic component is a torsion bar that is provided at a turning center relative to the seat portion of the arms, and one end of the torsion bar is fixed to one of the pair of arms while the other end is fixed to the rear end side of the seat portion at the other one of the pair of arms.

5. The seat of claim 4, wherein each of the pair of arms is provided at the turning component and the arms have front ends that move up and down with the turning of the turning component around the turning center, the seat further comprising a tension structure body comprising a backrest, an upper edge side of which is latched to an upper edge side of the seatback frame while a lower edge side is latched to a front end side of the arms.

6. The seat of claim 3, wherein the turning component is arranged so as to have play until engaging the seatback frame in a no-load state.

7. The seat of claim 1, further comprising:

a seat portion arm component whose bottom end side is turnably supported at the rear portion of a seat cushion and which twists a seat portion torsion bar provided at a turning center portion due to turning; and a seat portion tension structure body whose front end side is latched to a front edge side of a seat portion frame while a rear edge side is latched to an upper edge side of the seat portion arm component, and which moves an upper edge of the seat portion arm component up and down.

8. The seat of claim 1, further comprising a seatback tension structure body that includes a seatback cushion material, wherein the seatback cushion material is attached to the seatback frame and the seat portion with tension-coil springs.

9. A seat comprising:

a seatback frame connected to a rear end side of a seat portion frame;

a seatback arm component whose rear end side is turnably supported at the seatback frame or the seat portion frame and which twists a seatback torsion bar provided at a turning center portion that moves a front end up and down due to turning; and a seatback tension structure body comprising a backrest, an upper edge side of which is latched to an upper edge side of the seatback frame while a lower edge side is latched to the front end side of the seatback arm component, wherein the seatback torsion bar has a first end and a second end, a longitudinal axis, and the torsion bar is fixed to the seatback frame so that it is non-rotatable about the axis relative to the seatback frame, the seatback frame has a pair of left and right side frames, and the first end of the torsion bar is fixed to one of the pair of side frames and the second end of the torsion bar is fixed to the rear edge side of the seat portion frame at the other of the pair of side frames.

10. The seat of claim 9, further comprising:

a seat portion arm component whose bottom edge side is turnably supported at the rear portion of a seat cushion and which twists a seat portion torsion bar provided at a turning center portion due to turning; and a seat portion tension structure body whose front end side is latched to a front edge side of the seat portion frame while a rear edge side is latched to an upper edge side of the seat portion arm component, and which moves an upper edge of the seat portion arm component forwards and downwards.

11. The seat of claim 9, wherein the tension bar is selectively positioned in the up and down direction.

* * * * *